US012779990B2

(12) United States Patent
Duquette et al.

(10) Patent No.: US 12,779,990 B2
(45) Date of Patent: Nov. 3, 2026

(54) ENGINE MOUNTS, ENGINE ASSEMBLIES AND VEHICLES HAVING SAME

(71) Applicant: BOMBARDIER RECREATIONAL PRODUCTS INC., Valcourt (CA)

(72) Inventors: Mathieu Duquette, Sherbrooke (CA); Pierre Poulin, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 158 days.

(21) Appl. No.: 18/833,295

(22) PCT Filed: Jan. 13, 2023

(86) PCT No.: PCT/IB2023/050333
§ 371 (c)(1),
(2) Date: Jul. 25, 2024

(87) PCT Pub. No.: WO2023/144647
PCT Pub. Date: Aug. 3, 2023

(65) Prior Publication Data

US 2025/0115119 A1 Apr. 10, 2025

Related U.S. Application Data

(60) Provisional application No. 63/304,592, filed on Jan. 29, 2022.

(51) Int. Cl.

| | |
|---|---|
| ***B60K 17/354*** | (2006.01) |
| ***B60K 5/12*** | (2006.01) |
| ***B60K 17/08*** | (2006.01) |
| ***B60K 17/22*** | (2006.01) |

(52) U.S. Cl.
CPC .............. *B60K 17/354* (2013.01); *B60K 5/12* (2013.01); *B60K 17/08* (2013.01); *B60K 17/22* (2013.01)

(58) Field of Classification Search
CPC ...... B60K 17/354; B60K 17/34; B60K 17/08; B60K 17/06; B60K 17/22; B60K 5/12; B60K 5/02
See application file for complete search history.

(56) References Cited

U.S. PATENT DOCUMENTS

| | | | |
|---|---|---|---|
| 4,213,512 | A | 7/1980 | Mazziotti |
| 4,796,722 | A | 1/1989 | Kumagai |
| 6,632,144 | B1 | 10/2003 | Narita et al. |

(Continued)

FOREIGN PATENT DOCUMENTS

| | | | | |
|---|---|---|---|---|
| CN | 201824799 | U | * | 5/2011 |
| FR | 3029494 | A1 | | 6/2016 |
| WO | 2021152167 | A1 | | 8/2021 |

OTHER PUBLICATIONS

International Search Report of PCT/IB2023/050333; Shane Thomas; Mar. 29, 2023.

*Primary Examiner* — John D Walters
(74) *Attorney, Agent, or Firm* — BCF LLP

(57) ABSTRACT

An engine mount for an engine for a vehicle. The engine mount includes an engine mount body configured for connecting to an engine casing of the engine, the engine mount body being further configured for connecting to a frame of the vehicle; and at least one bearing disposed in the engine mount body, the at least one bearing being arranged to receive and operatively couple to a drive shaft of the vehicle.

4 Claims, 19 Drawing Sheets

(56) References Cited

U.S. PATENT DOCUMENTS

| | | | | |
|---|---|---|---|---|
| 8,651,217 | B2 * | 2/2014 | Kim | B60K 5/1241<br>267/140.3 |
| 8,875,830 | B2 | 11/2014 | Massicotte et al. | |
| 9,254,743 | B2 * | 2/2016 | Yoo | F16C 35/047 |
| 12,202,313 | B2 * | 1/2025 | Heon | B60G 3/202 |
| 12,377,694 | B2 * | 8/2025 | Heon | B60G 15/065 |
| 2012/0048638 | A1 | 3/2012 | Kim et al. | |
| 2015/0167744 | A1 | 6/2015 | Yoo et al. | |
| 2023/0347701 | A1 | 11/2023 | Heon et al. | |
| 2023/0364957 | A1 | 11/2023 | Heon et al. | |

* cited by examiner

ENGINE MOUNTS, ENGINE ASSEMBLIES AND VEHICLES HAVING SAME

CROSS-REFERENCE TO RELATED APPLICATION

The present application claims priority to U.S. Provisional Patent Application No. 63/304,592, entitled "Engine Mounts, Engine Assemblies and Vehicles Having Same", filed Jan. 29, 2022, the entirety of which is incorporated herein by reference.

FIELD OF TECHNOLOGY

The present technology relates to off-road vehicles, specifically powertrain arrangements of off-road vehicles.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

For operating a side-by-side off-road vehicle in rough, off-road conditions, a lower center of gravity generally aids in maintaining stability. Lowering the center of gravity in an off-road vehicle could be accomplished by, for example, positioning at least some of the heavier components as low possible in the vehicle. In theory, lowering the placement of the engine, for example, could aid in lowering the center of gravity.

In practice however, there are often limitations on the placement of the heavier components, such as the engine, due to constraints imposed by elements that may need to extend under these components. In a four-wheel or all-wheel drive vehicle, for example, a drivetrain extending from a transmission to both the front wheels and the rear wheels may need to under pass the engine, thereby limiting how low the engine can be placed.

Thus there is a desire for powertrain arrangements for side-by-side off-road vehicles that address at least some of the above concerns.

SUMMARY

It is an object of the present technology to ameliorate at least some of the inconveniences present in the prior art.

According to some aspects of the present technology, there is provided an engine mount for connecting an engine of a vehicle to a frame thereof. The engine mount includes one or more bearings for supporting a connection of a drive shaft, disposed rear of the engine, to another drive shaft extending forward of the engine. By passing the drive shaft assembly through the engine mount, the engine can be lowered, as the drive shafts are not required to pass under the engine mount and/or the engine.

According to one aspect of the present technology, there is provided an engine mount for an engine for a vehicle. The engine mount includes an engine mount body configured for connecting to an engine casing of the engine, the engine mount body being further configured for connecting to a frame of the vehicle; and at least one bearing disposed in the engine mount body, the at least one bearing being arranged to receive and operatively couple to a drive shaft of the vehicle.

In some embodiments, the drive shaft is a first drive shaft; the at least one bearing is configured to receive the first drive shaft on a first side of the engine mount; the at least one bearing is further arranged to operatively couple to a second drive shaft extending from a second side of the engine mount; and the first and second drive shafts being arranged to transfer torque therebetween.

In some embodiments, the engine mount body defines a passage therethrough; and the at least one bearing is disposed in the passage.

In some embodiments, when the engine mount is installed in the vehicle, the passage is oriented longitudinally with respect to the vehicle.

In some embodiments, the engine mount is arranged to connect to the engine casing on a left side of the engine.

In some embodiments, when the engine mount is installed in the vehicle: the drive shaft is operatively connected to a transmission of the vehicle; the drive shaft and the transmission are disposed rearward of the engine; and the at least one bearing is operatively coupled to the drive shaft on a rear side of the engine mount body.

According to another aspect of the present technology, there is provided an engine assembly for a vehicle, the engine assembly including an engine including an engine casing; and an engine mount configured for connecting to a frame of the vehicle. The engine mount includes an engine mount body connected to the engine casing, and at least one bearing disposed in the engine mount body, the at least one bearing being arranged to receive a drive shaft of the vehicle.

In some embodiments, a bottom surface of the engine is lower than a top-most point of the drive shaft when connected to the at least one bearing.

In some embodiments, the engine includes a crankshaft arranged to operatively connect to a transmission of the vehicle; the crankshaft rotates about a crankshaft axis; and the crankshaft axis is parallel to an axis of rotation of the at least one bearing of the engine mount.

In some embodiments, the drive shaft is a first drive shaft; the at least one bearing is configured to receive the first drive shaft on a first side of the engine mount; the at least one bearing is further arranged to operatively couple to a second drive shaft extending from a second side of the engine mount; and the first and second drive shafts being arranged to transfer torque therebetween.

In some embodiments, the engine mount body defines a passage therethrough; and the at least one bearing is disposed in the passage.

In some embodiments, the engine mount is arranged to connect to the engine casing on a left side of the engine.

In some embodiments, when the engine assembly is installed in the vehicle: the drive shaft is operatively connected to a transmission of the vehicle; the drive shaft and the transmission are disposed rearward of the engine; and the at least one bearing is operatively coupled to the drive shaft on a rear side of the engine mount body.

According to another aspect of the present technology, there is provided a vehicle including a frame; an engine including an engine casing; and an engine mount connecting the engine to the frame, the engine mount includes an engine mount body connected to the engine casing, and at least one bearing disposed in the engine mount body; a transmission operatively connected to the engine; and a drive shaft operatively connected between the transmission and the at least one bearing.

In some embodiments, the drive shaft is a first drive shaft; the first drive shaft is connected to the at least one bearing on a rear side of the engine mount; the vehicle further comprises a second drive shaft operatively connected to the at least one bearing on a front side of the engine mount; and the first and second drive shafts being arranged to transfer torque therebetween.

In some embodiments, a bottom surface of the engine is lower than a top-most point of the drive shaft.

In some embodiments, the engine includes a crankshaft operatively connected to the transmission; and the crankshaft is aligned longitudinally rearward from the engine; and the drive shaft extends longitudinally between the at least one bearing and the transmission.

For purposes of this application, terms related to spatial orientation such as forwardly, rearward, upwardly, downwardly, left, and right, are as they would normally be understood by a driver of the vehicle sitting therein in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Explanations and/or definitions of terms provided in the present application take precedence over explanations and/or definitions of these terms that may be found in any documents incorporated herein by reference.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale, unless otherwise indicated.

DETAILED DESCRIPTION

The present technology will be described with respect to a four-wheel off-road vehicle 10 having two side-by-side seats and a steering wheel. However, it is contemplated that some aspects of the present technology may apply to other types of vehicles such as, but not limited to, off-road vehicles having a handlebar and a straddle seat (i.e. an all-terrain vehicle (ATV)) and off-road vehicles having more than four wheels.

Figure 1:
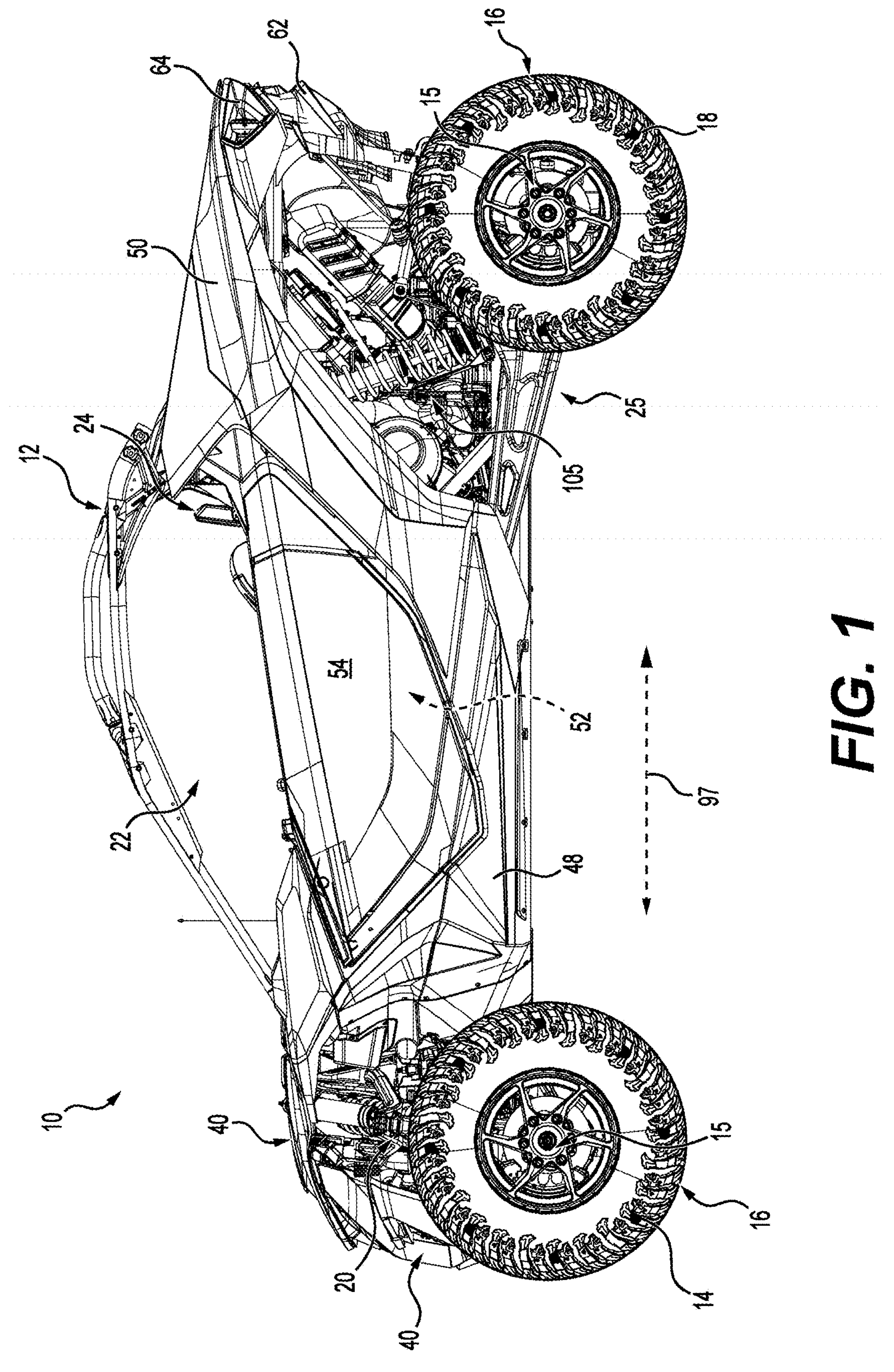
FIG. 1 is a left side elevation view of an off-road vehicle.
Figure 2:
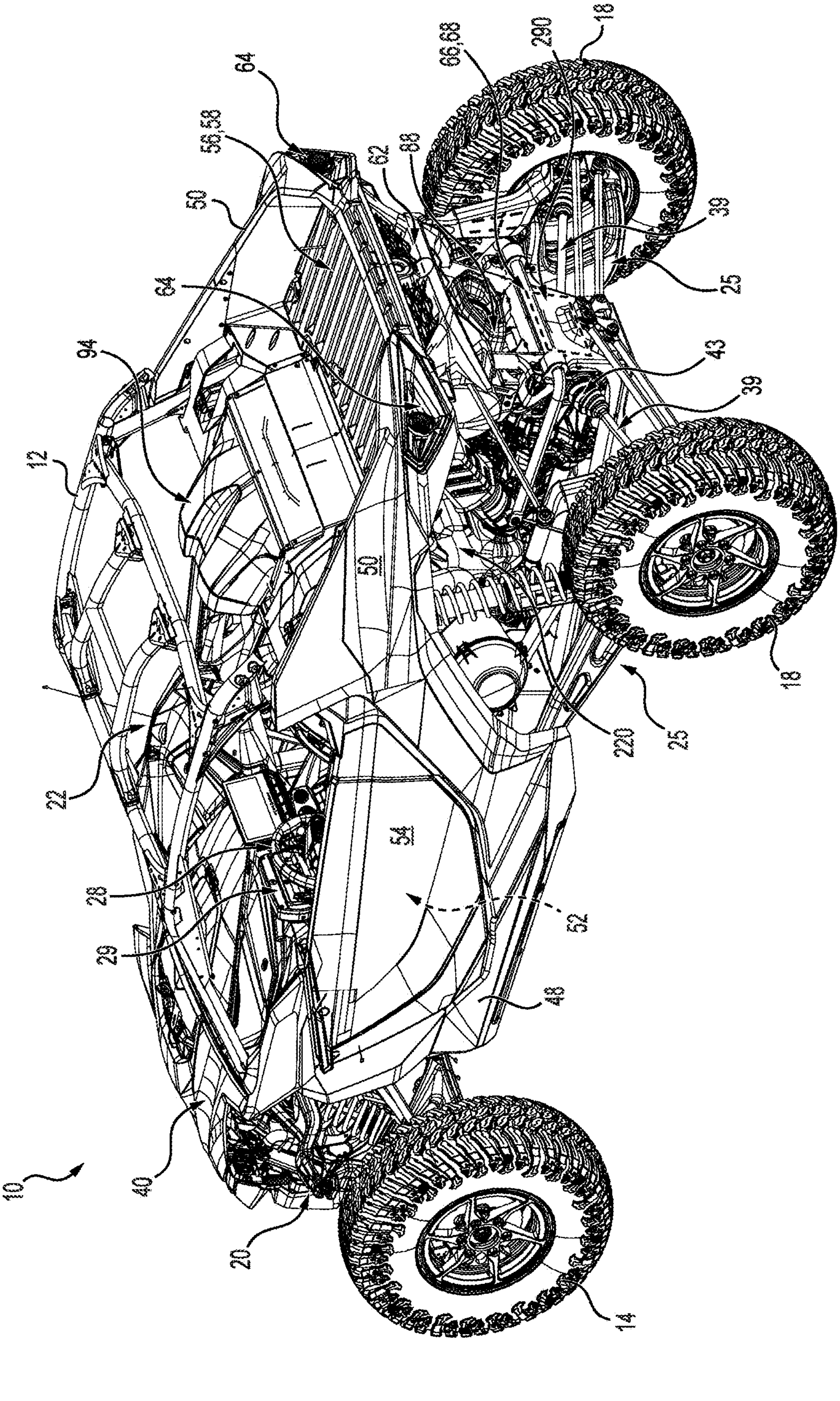
FIG. 2 is a top, rear, left side perspective view of the vehicle of FIG. 1.
Figure 3:
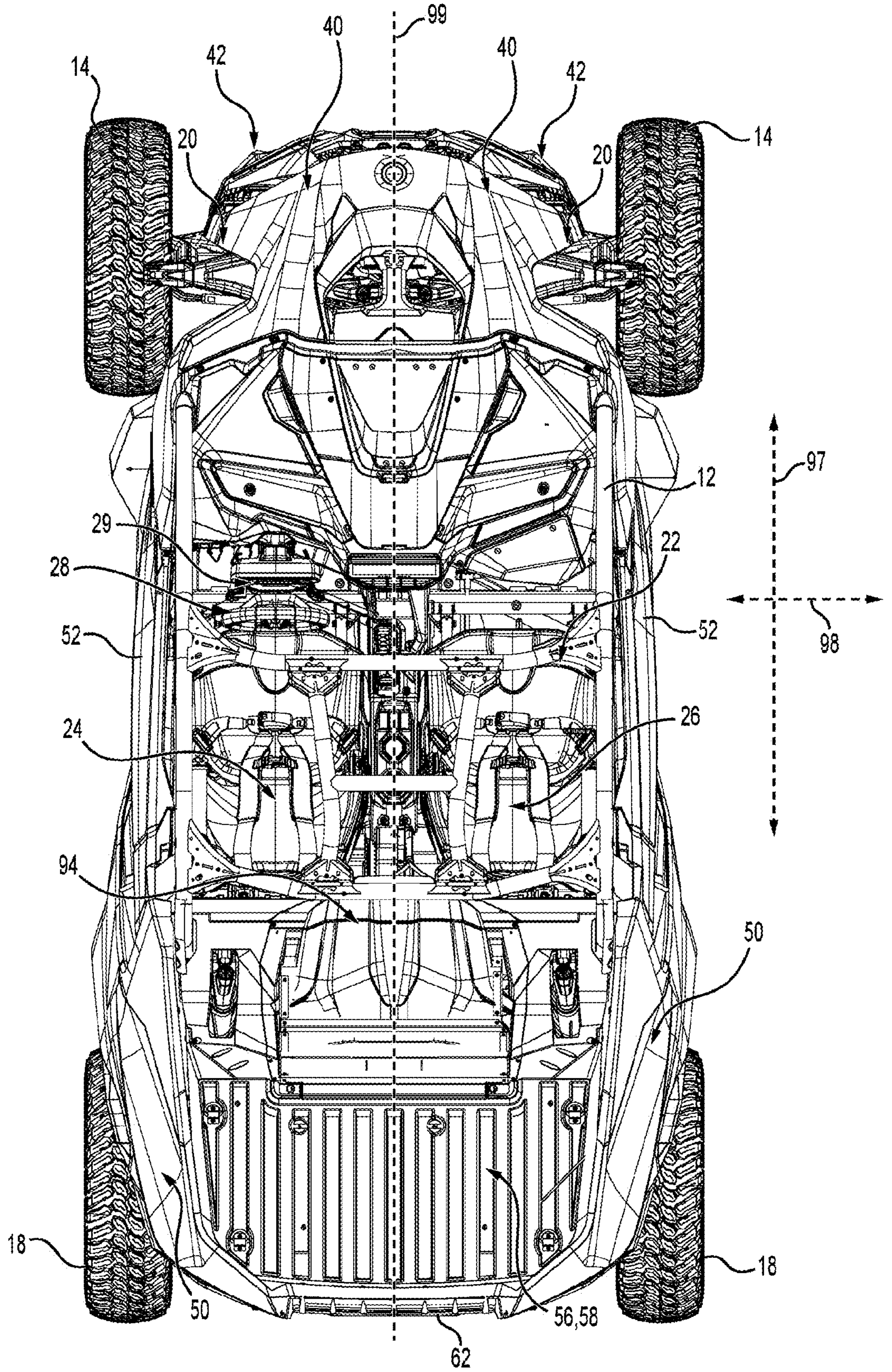
FIG. 3 is a top plan view of the vehicle of FIG. 1.
Figure 4:
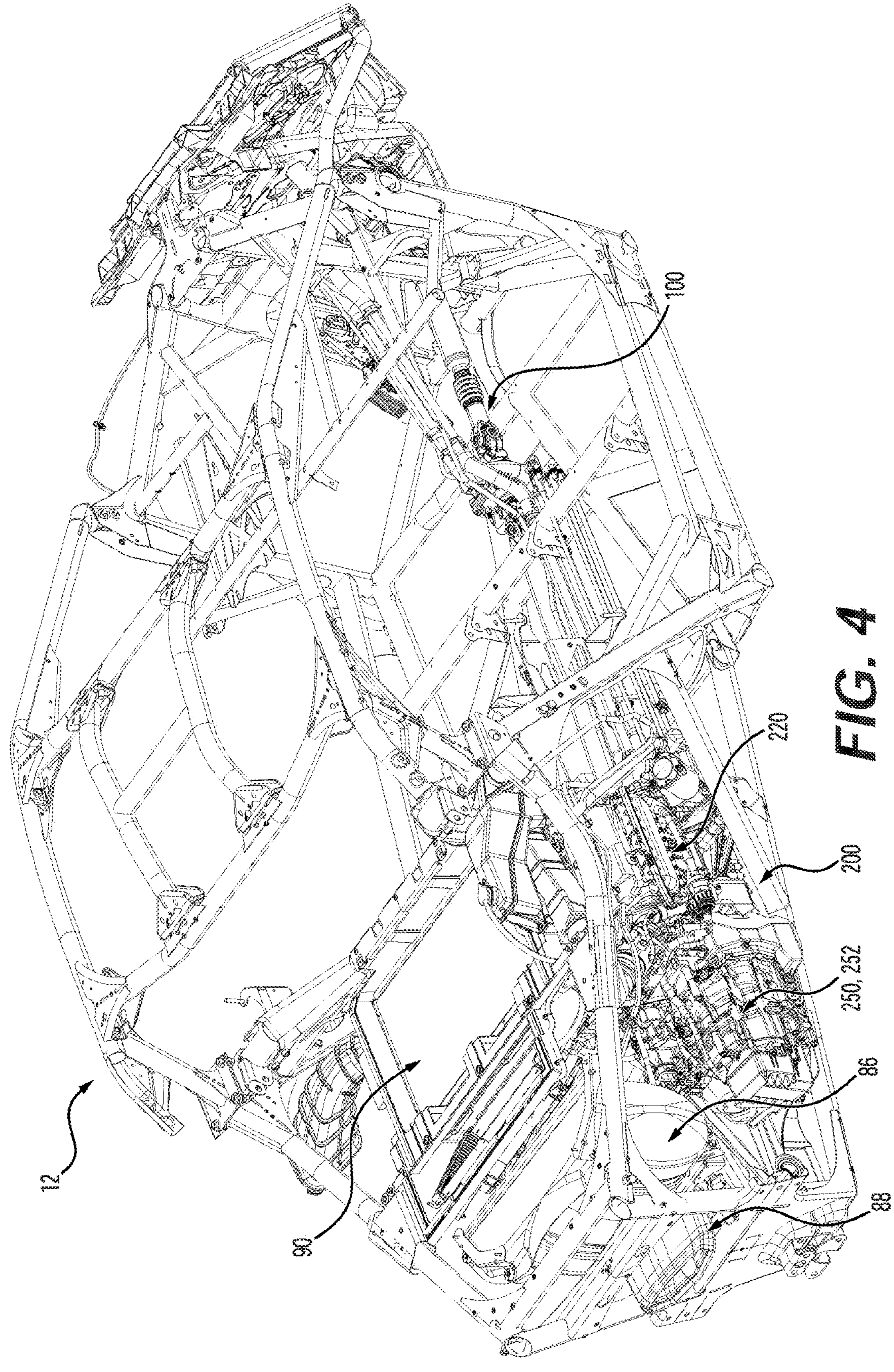
FIG. 4 is a rear, right side perspective view of a frame and a powertrain of the vehicle of FIG. 1.

The general features of the off-road vehicle 10 will be described with respect to FIGS. 1 to 3. The vehicle 10 has a frame 12, two front wheels 14, and two rear wheels 18. Each wheel 14, 18 includes a rim 15 and a tire 16 mounted to the rim 15. As is illustrated in FIG. 3, the vehicle 10 defines a longitudinal direction 97, extending from a front end of the vehicle 10 to a rear end, as well as a lateral direction 98, extending from left to right of the vehicle 10. A center plane 99 of the vehicle 10 extends in the longitudinal direction 97 and defines a laterally center position of the vehicle 10.

The two front wheels 14 are connected to a front of the frame 12 by front suspension assemblies 20. Depending on the embodiment, different types of front suspension assemblies could be used. The illustrated front suspension assemblies 20 are described in further detail in International Patent Application No. PCT/IB2021/059019, filed Sep. 30, 2021, the entirety of which is incorporated herein by reference. The two rear wheels 18 are connected to a rear portion of the frame 12 by rear suspension assemblies 25. Depending on the embodiment, different types of rear suspension assemblies could be used. The illustrated rear suspension assemblies 25 are described in further detail in International Patent Application No. PCT/IB2021/059022, filed Sep. 30, 2021, the entirety of which is incorporated herein by reference.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10.

A steering wheel 28 is disposed in front of the driver seat 24. The steering wheel 28 is used to turn the front wheels 14 to steer the vehicle 10. Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

The vehicle 10 includes body panels connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 20 and laterally between the front wheels 14. The front panels 40 define two apertures inside which the headlights 42 of the vehicle 10 are disposed. A generally U-shaped panel 48 is disposed on each of the left and right sides of the vehicle 10, rearward of the front wheels 14. Generally L-shaped rear panels 50 extend upward and then rearward from the rear, upper ends of the U-shaped panels 48. Each rear panel 50 is disposed in part above and in part forward of its corresponding rear wheel 18. The rear panels 50 define apertures at the rear thereof to receive the brake lights 64 of the vehicle 10. It is contemplated that the brake lights 64 could be replaced with reflectors or that reflectors could be provided in addition to the brake lights 64.

On each side of the vehicle 10, the panel 48 and the rear panel 50 define a passage 52 through which a driver (or passenger depending on the side of the vehicle 10) can enter or exit the vehicle 10. Each side of the vehicle 10 is provided with a door 54 that selectively closes the corresponding passage 52. Each door 54 is hinged at a front thereof to its corresponding rear fender 50 and associated portion of the frame 12 and is selectively connected at a rear thereof to its corresponding rear panel 50 via a releasable latch (not shown). It is contemplated that each door 54 could be hinged at a front thereof and latched at a rear thereof. As best seen in FIGS. 1 and 2 for the left side of the vehicle 10, the passages 52 are closed when the doors 54 are closed. It is contemplated that the doors 54 could be smaller so as to leave portions, for example lower portions, of the passages 52 open when the doors 54 are closed. It is also contemplated that nets could be included to cover a portion of the passages 52 when the doors 54 are closed.

As best seen in FIG. 3, the rear panels 50 define a cargo space 56 therebetween behind the seats 24, 26. The cargo space 56 has a floor 58 extending horizontally between the rear fenders 50. The floor 58 has a plurality of apertures such that the floor 58 can act as an attachments base to receive anchors in order to secure various items in the cargo space 56. One example of such anchors and apertures are described in U.S. Pat. No. 8,875,830, issued Nov. 4, 2014, the entirety of which is incorporated herein by reference. It is contemplated that hooks or loops could be provided instead of or in addition to the apertures in the floor 58. It is also contemplated that the floor 58 could not be provided with any attachment features. It is further contemplated that the floor 58 could be replaced by a cargo box that can be tilted in order to dump its content. As best seen in FIG. 2, rear panels 62 are disposed laterally between the rear wheels 18 behind the floor 58.

Returning to FIG. 2, the vehicle 10 also includes two shafts 39, also referred to as half-shafts 39, which connect the rear wheels 18 to a rear final drive 290 of a vehicle powertrain 100, both of which are described in more detail below. A left shaft 39 has a laterally outward end connected to the rear left wheel 18 and a laterally inward end connected to the rear final drive 290. A right shaft 39 has a laterally outward end connected to the rear right wheel 18 and a laterally inward end connected to the rear final drive 290. The rear final drive 290 is operatively connected to and drives the left and right shafts 39 via constant velocity (CV) joints (not shown), also known as homokinetic joints, located inside flexible covers 43. The vehicle 10 further includes a sway bar assembly 66 disposed in a rear portion of the vehicle 10. The sway bar assembly 66 includes a sway bar 68, pivotally connected to the lower rear portion of the frame 12 and operatively connected to the rear suspension assemblies 25.

With additional reference to FIGS. 4 to 7, the vehicle 10 includes a powertrain 100 for driving ground-engaging members of the vehicle 10, specifically for driving the rear wheels 18 and selectively driving the front wheels 14. The powertrain 100 includes a rear drive unit 200, disposed in and supported by rear portions of the frame 12. The rear drive unit 200 includes an engine 220, a transmission 250, and a rear final drive 290, all connected together to form the rear drive unit 200. As the rear drive unit 200 is formed without intervening components between the engine 220, the transmission 250, and the rear final drive 290, the heavier components of the powertrain 100 have a relatively compact arrangement in the vehicle 10.

The rear final drive 290 is operatively connected to the rear wheels 18 via the half-shafts 39, as is mentioned above. The powertrain 100 also includes a forward drive assembly 120 operatively connected to and driven by the rear drive unit 200 for selectively driving the front wheels 14, described further below.

Figure 5:
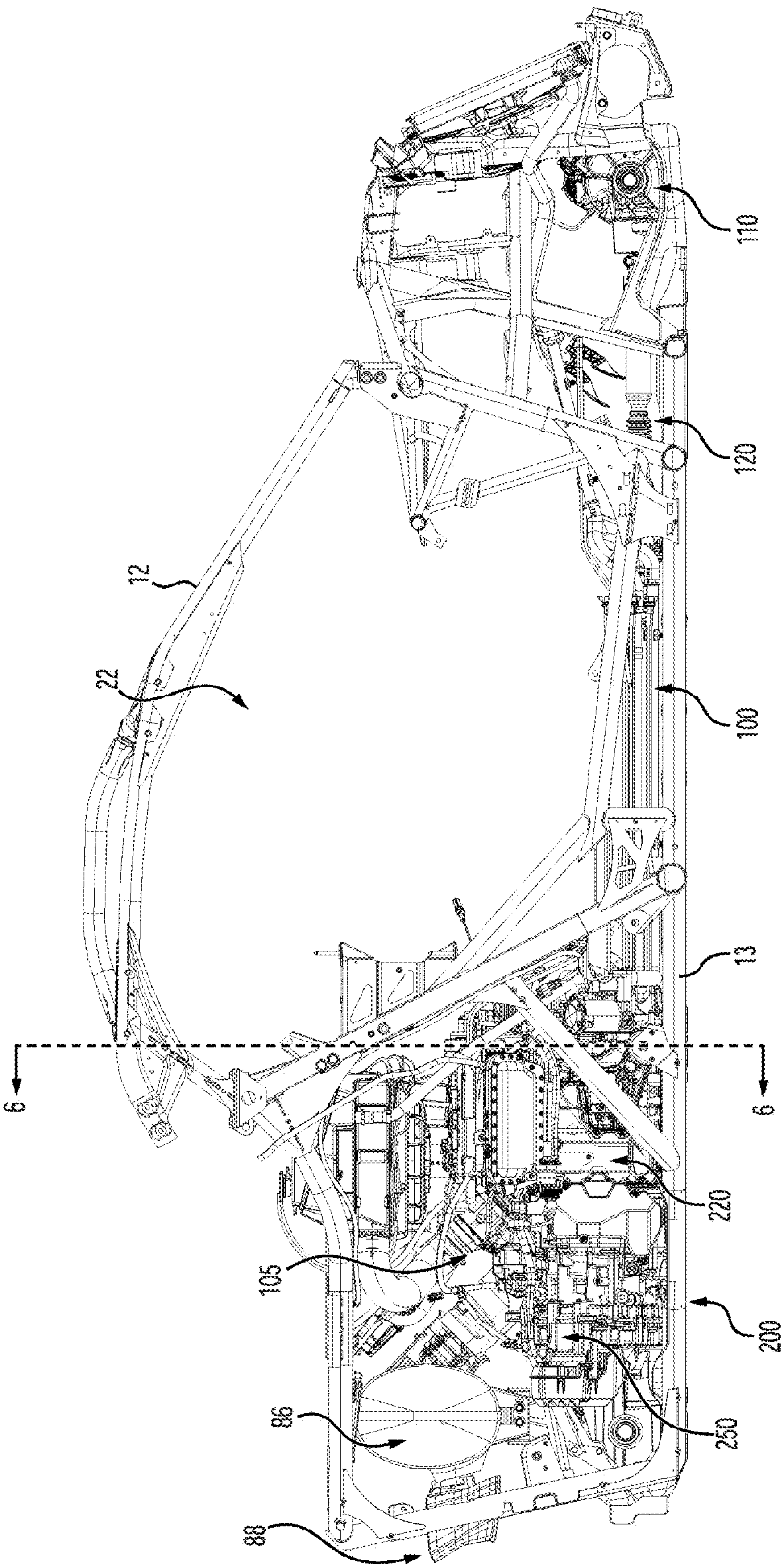
FIG. 5 is a right side elevation view of the frame and the powertrain of FIG. 4.
Figure 6:
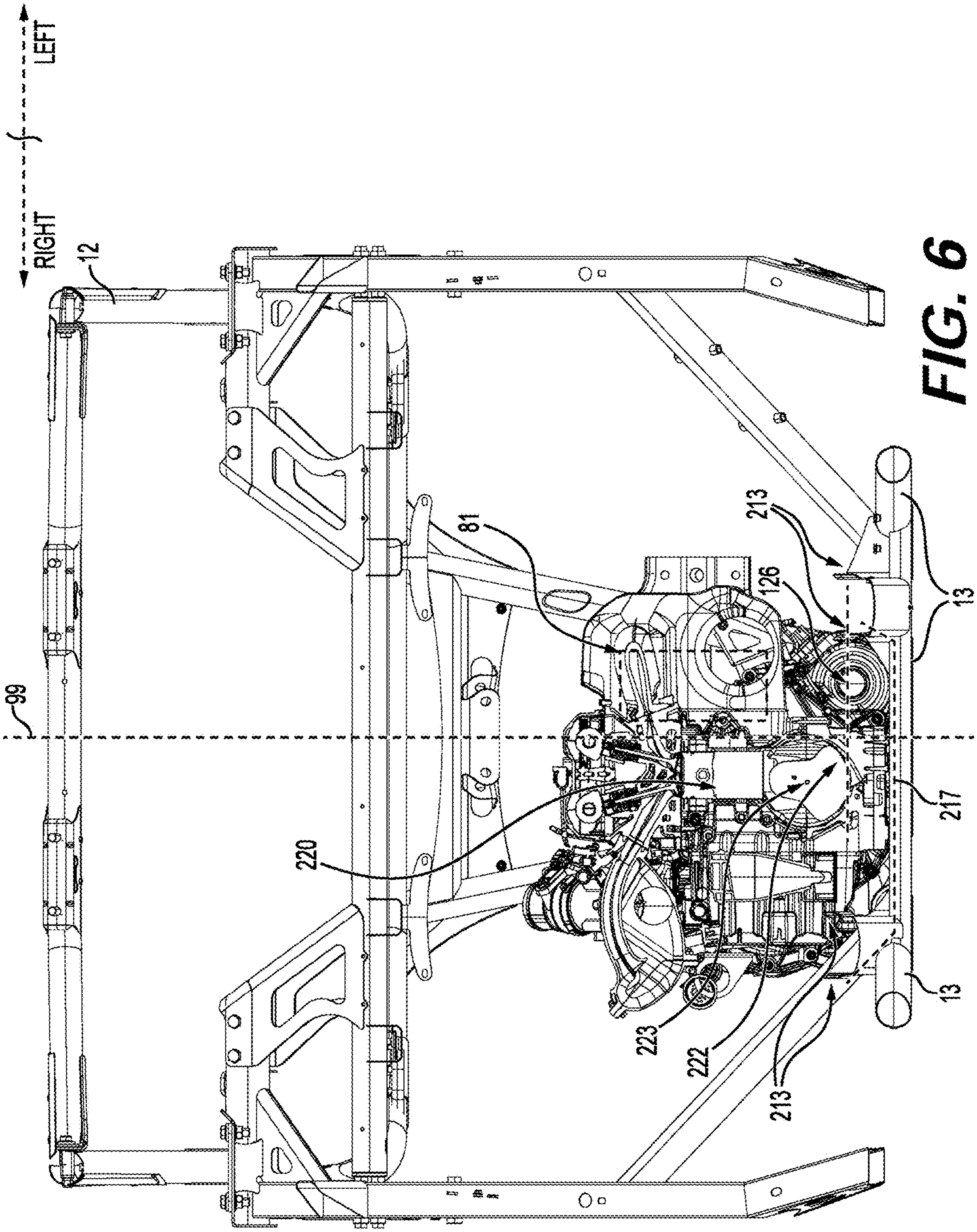
FIG. 6 is a cross-sectional view of the frame and the powertrain of FIG. 4, taken along line 6-6 of FIG. 5.

Shown in additional detail in FIGS. 8 to 12, the engine 220 of the rear drive unit 200, disposed in a rear portion of the vehicle 10, includes an engine casing 221 forming an exterior of the engine 220. The vehicle 10 includes an engine mount 230 for connecting the engine 220, specifically the engine casing 221, to a left side of the frame 12. Details of the engine mount 230 are described further below. The vehicle 10 includes additional support structures (not separately identified) for connecting the engine 220 to the frame 12. As can be seen in FIGS. 5 and 6, the frame 12 includes multiple lower frame tubes 13 for supporting the engine 220 and the rear drive unit 200 more generally. As is illustrated schematically in FIG. 6, the engine 220 is disposed relatively low in the frame 12, such that a lowest point 217 of the engine 220 is disposed vertically lower than a top surface of one or more of the lower frame tubes 13. One or more of the frame tubes of the frame 12 also passes under the engine 220.

Figure 11:
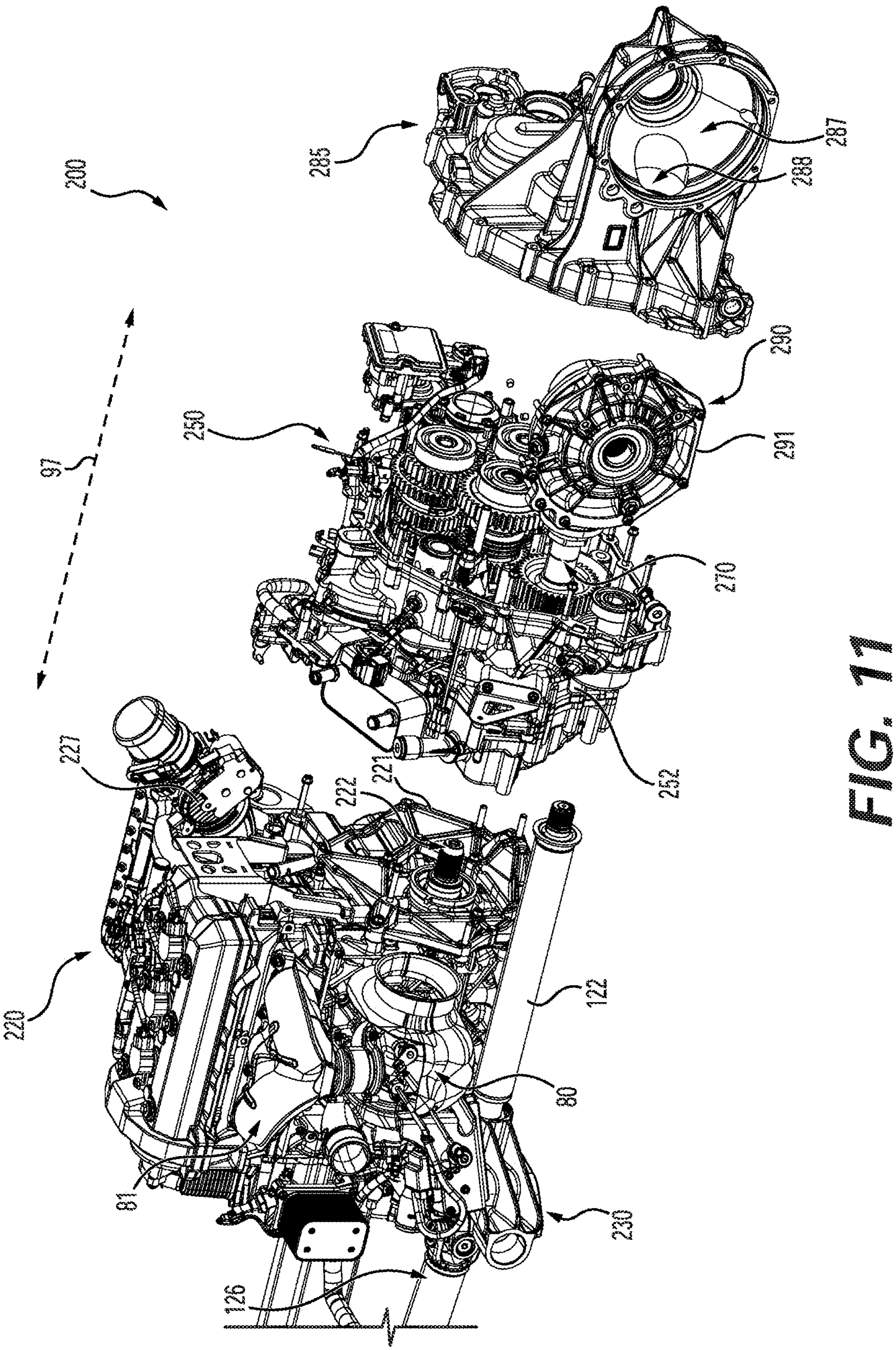
FIG. 11 is a partially exploded, perspective view of the rear drive unit of FIG. 8.
Figure 12:
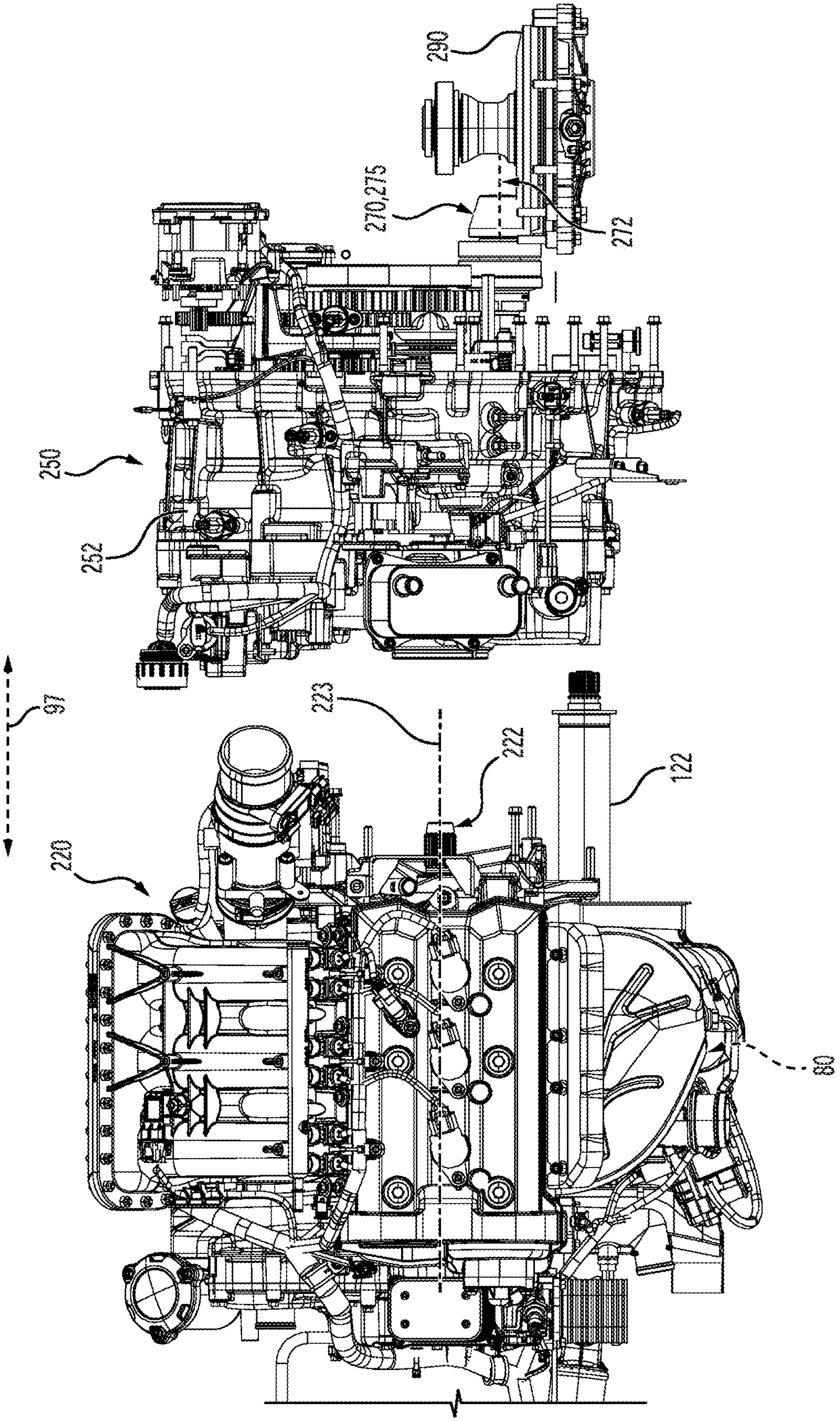
FIG. 12 is a partially exploded, top plan view of the rear drive unit of FIG. 8, with a portion of a housing having been removed.

The engine 220 in the present embodiment is an inline three-cylinder engine 220. As would be understood from the placement of three spark plugs 225 (see FIGS. 8 and 10), cylinders of the engine 220 are aligned longitudinally, i.e. in alignment along the longitudinal direction 97. The engine 220 includes a crankshaft 222 rotating about a crankshaft axis 223 (FIG. 12). As can be seen in FIGS. 11 and 12, the crankshaft 222 and the crankshaft axis 223 extend longitudinally in the vehicle 10, i.e. in the longitudinal direction 97.

As can be seen from the cross-sectional view in FIG. 6, the crankshaft 222 and the crankshaft axis 223 are disposed on a right side of the vehicle center plane 99.

Figure 8:
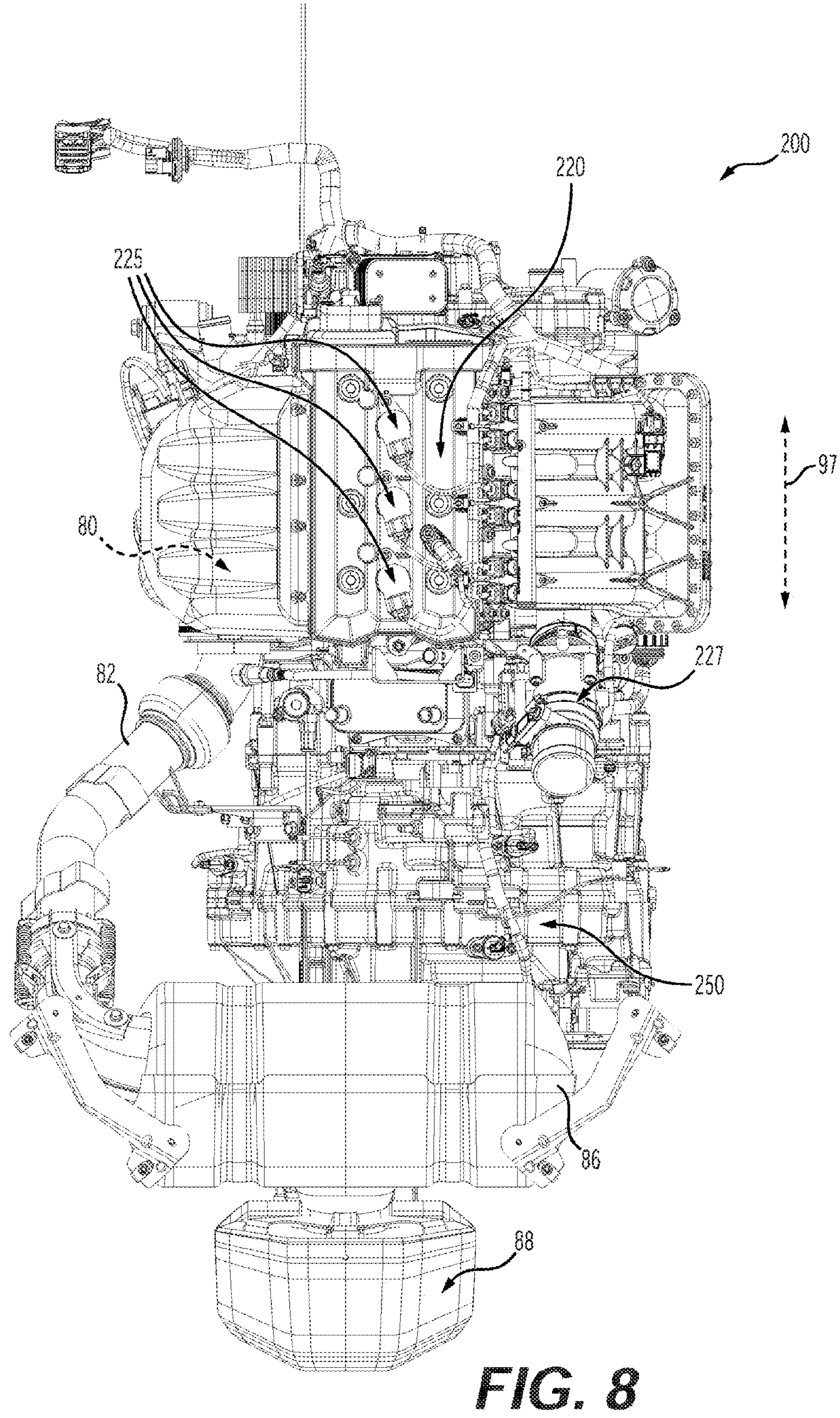
FIG. 8 is a top plan view of a rear drive unit of the powertrain and portions of an exhaust system of the vehicle of FIG. 1.

With reference to FIGS. 5 and 8, the vehicle 10 includes an engine exhaust system operatively connected to the rear drive unit 200, and more specifically to the engine 220. Exhaust gases from combustion chambers of the engine 220 enter the engine exhaust system via an exhaust manifold 81 (see FIGS. 10 and 11), fluidly connected to the cylinders of the engine 220. From the exhaust manifold 81, the exhaust gases flow to a turbocharger 80 to drive a turbine (not shown) thereof. The turbocharger 80 is fluidly connected to an air inlet of the engine 220 (described further below). A majority of the exhaust manifold 81 is disposed on a left side of the center plane 99, as is schematically illustrated in FIG. 6.

From the turbocharger 80, the exhaust gases flow in an exhaust pipe 82 that extends generally rearward. The exhaust pipe 82 is fluidly connected to a muffler 86 such that the muffler 86 is thus fluidly connected to the engine 220. From the muffler 86, the exhaust gases flow in an exhaust pipe 88 extending from the rear side of the muffler 86. The exhaust pipe 88 is laterally centered on the vehicle 10. Both the muffler 86 and the exhaust pipe 88 are disposed rearward of the engine 220 and the transmission 250 connected thereto.

Figure 9:
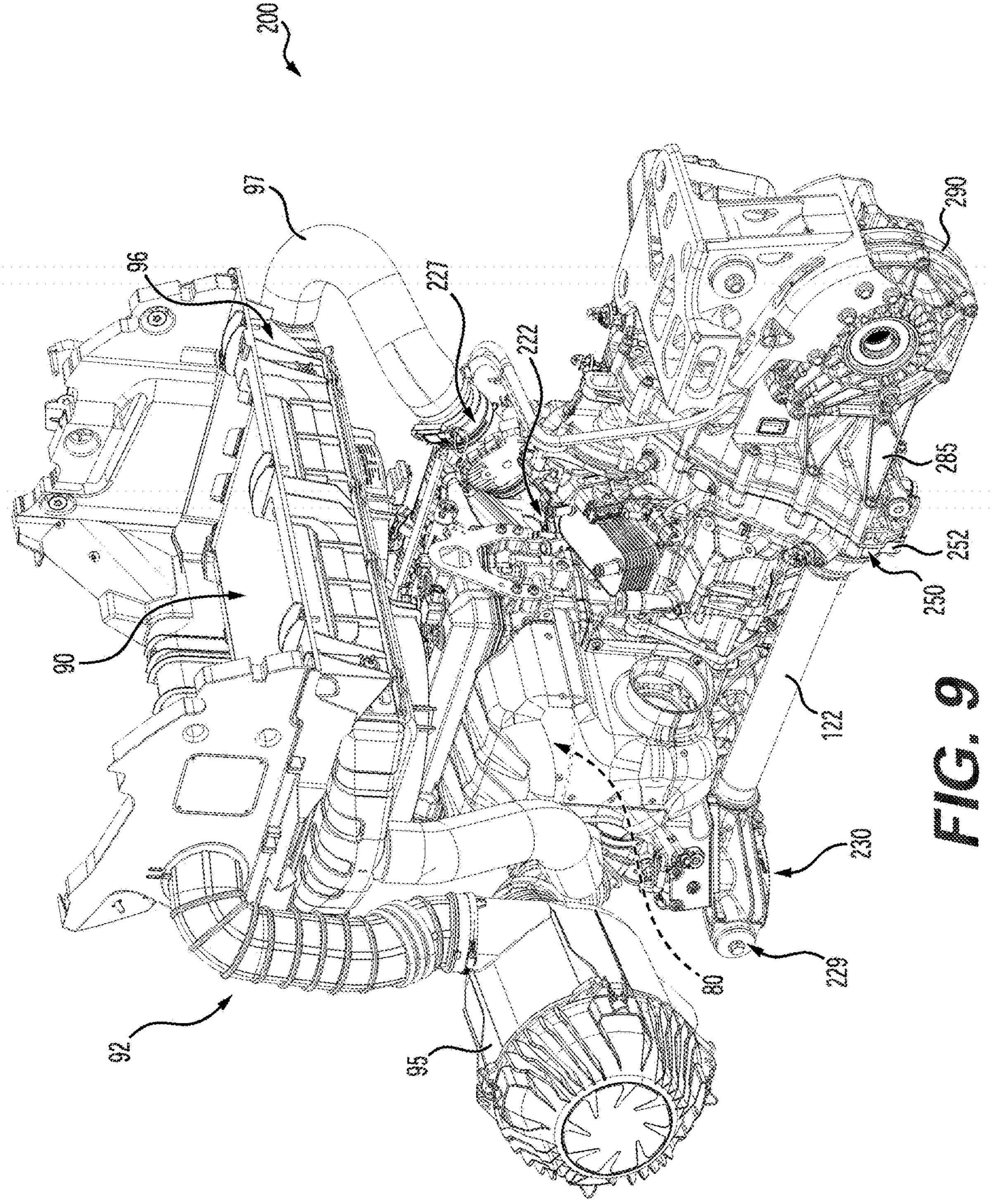
FIG. 9 is a rear, left side perspective view of the rear drive unit and portions of an air intake system of the vehicle of FIG. 1.

Turning now to FIG. 9, an air intake system providing air to the engine 220 will be described. The air intake system includes a plenum 90 and an engine air intake system 92. The plenum 90 defines a volume which receives air from the atmosphere and from which air is supplied to various components of the vehicle 10, including the engine 220. In the present embodiment, the plenum 90 is disposed rearward of the seats 24, 26 and is laterally centered on the vehicle 10. The plenum 90 is disposed vertically higher than the engine 220. A plenum air intake 94 (FIGS. 2 and 3) defines a top of the plenum 90, and supplies air from the atmosphere to the plenum 90. As can be seen in FIG. 3, the plenum air intake 94 is laterally centered on the vehicle 10 and is disposed in part laterally between the headrests of the seats 24, 26. An inlet of the plenum air intake 94 faces generally forward and, as would be understood, when the vehicle 10 is moving forward, the forward motion of the vehicle 10 causes air to be rammed into the plenum air intake 94.

An intercooler 96 defines a bottom of the plenum 90 and is disposed above the engine 220. The engine air intake system 92 is fluidly connected to the engine 220 to supply air to the engine 220 via the intercooler 96. From the plenum 90, air flows through a plurality of conduits (not separately identified) and a generally cylindrical air filter housing 95 containing an air filter (not shown) to the turbocharger 80. Exhaust gases supplied from the engine 220 power the turbine of the turbocharger 80, compressing the air supplied from the conduits. The turbocharger 80 is fluidly connected to a left side of the intercooler 96, such that the intercooler 96 can cool the compressed air supplied from the turbocharger 80. From a right side of the intercooler 96, air flows through a pipe 97 (see FIG. 9). The pipe 97 extends generally rearward, downward and leftward such that air enters a throttle body 227 of the engine 220 to control the flow of air to the engine 220. From the throttle body 227, the air enters an engine air intake plenum (not shown) thus supplying compressed, cooled air to air intake ports of the engine 220.

Returning to the rear drive unit 200, the transmission 250 is operatively connected to the engine 220 and disposed rearward thereof. Illustrated in more detail in FIGS. 11 to 14, the transmission 250 is specifically a dual-clutch transmission (DCT) 250. An embodiment of a DCT similar to the DCT 250 is described in more detail in International Patent Publication No. WO2021152167, published on Aug. 5, 2021, the entirety of which is incorporated herein by reference. Forward and middle portions of the transmission 250 are surrounded by a transmission housing 252 for protecting the transmission 250 disposed therein. The transmission housing 252 is removably fastened to the engine casing 221. The transmission 250 is thus disposed immediately rearward of the engine 220, without intervening operative components. Rear portions of the transmission 250 are surrounded and protected by a final drive housing 285 fastened to the transmission housing 252. As can be seen in FIG. 11, the housing 285 supports and partially surrounds the rear final drive 290, as well as surrounding rear portions of the transmission 250.

Figure 13:
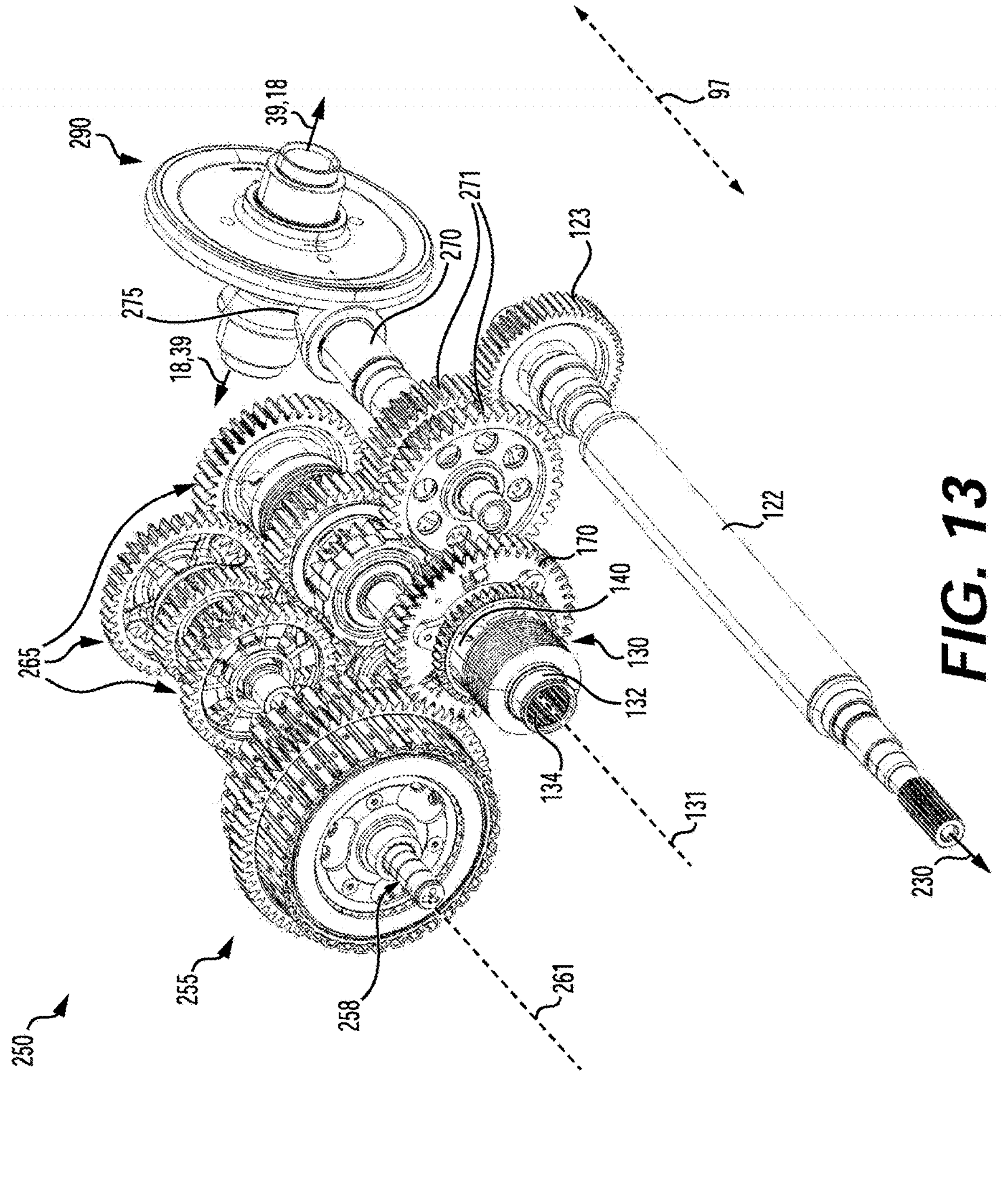
FIG. 13 is a perspective view taken from a top, front, left side of a transmission and a forward drive shaft of the drivetrain of FIG. 4, with a housing of the transmission removed.
Figure 14:
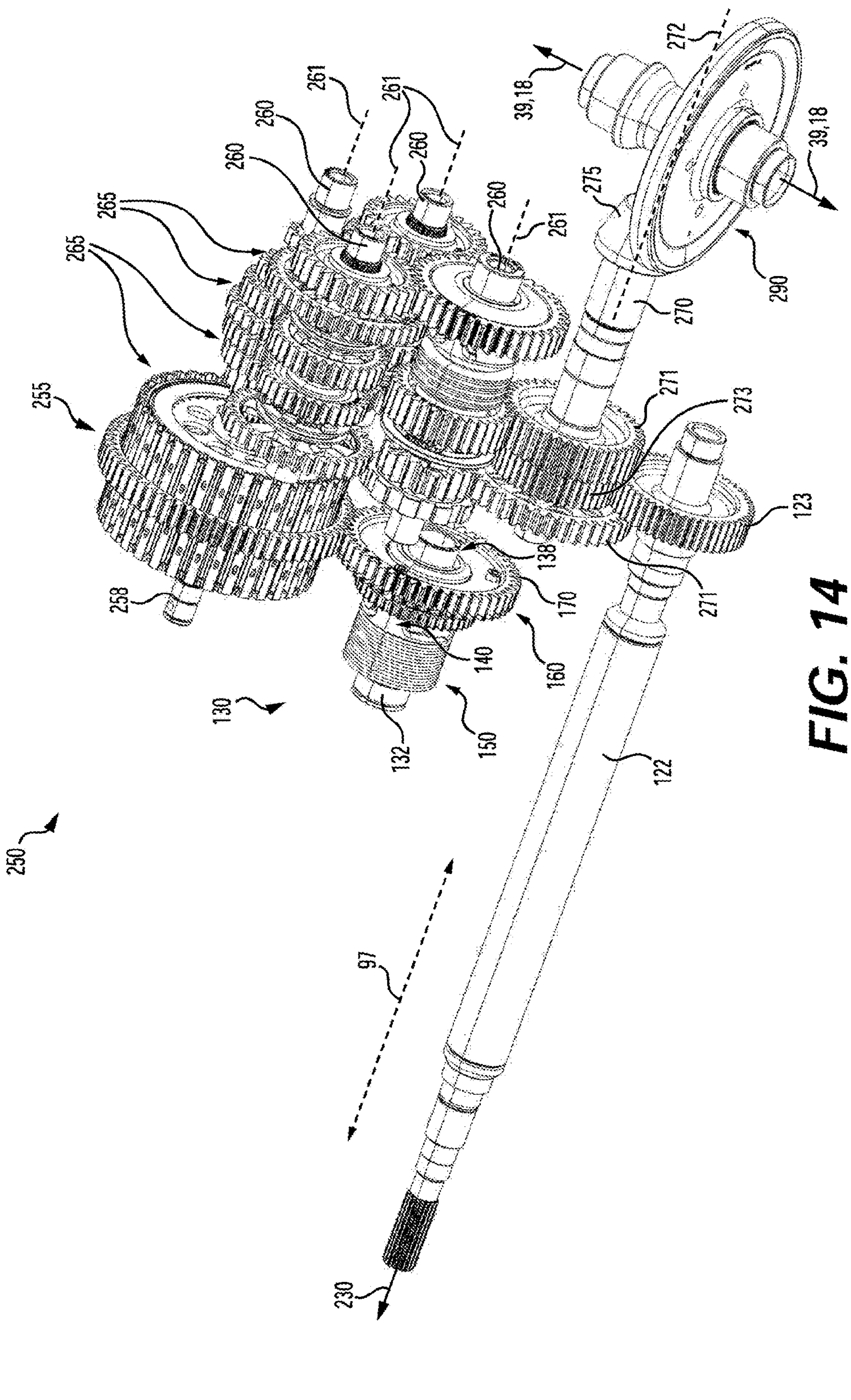
FIG. 14 is a perspective view taken from a top, rear, left side of the transmission and forward drive shaft of FIG. 13.

With reference to FIGS. 13 and 14, the transmission 250 includes a plurality of axles 260 and gears 265 disposed thereon for altering the gear ratio of the vehicle 10. The particular configuration of axles 260 and gears 265 could vary in different embodiments, with one possible arrangement being described in the above mentioned publication. Each axle 260 rotates about an axle rotation axis 261, parallel to the crankshaft axis 223. The axle rotation axes 261 and the crankshaft axis 223 are both also parallel to the longitudinal direction 97 in the illustrated embodiment. It is contemplated that at least one of the axles 260 could be differently oriented, for example by including bevel gears and arranging such an axle with a bevel gear perpendicular to the remaining axles 260.

Figure 15:
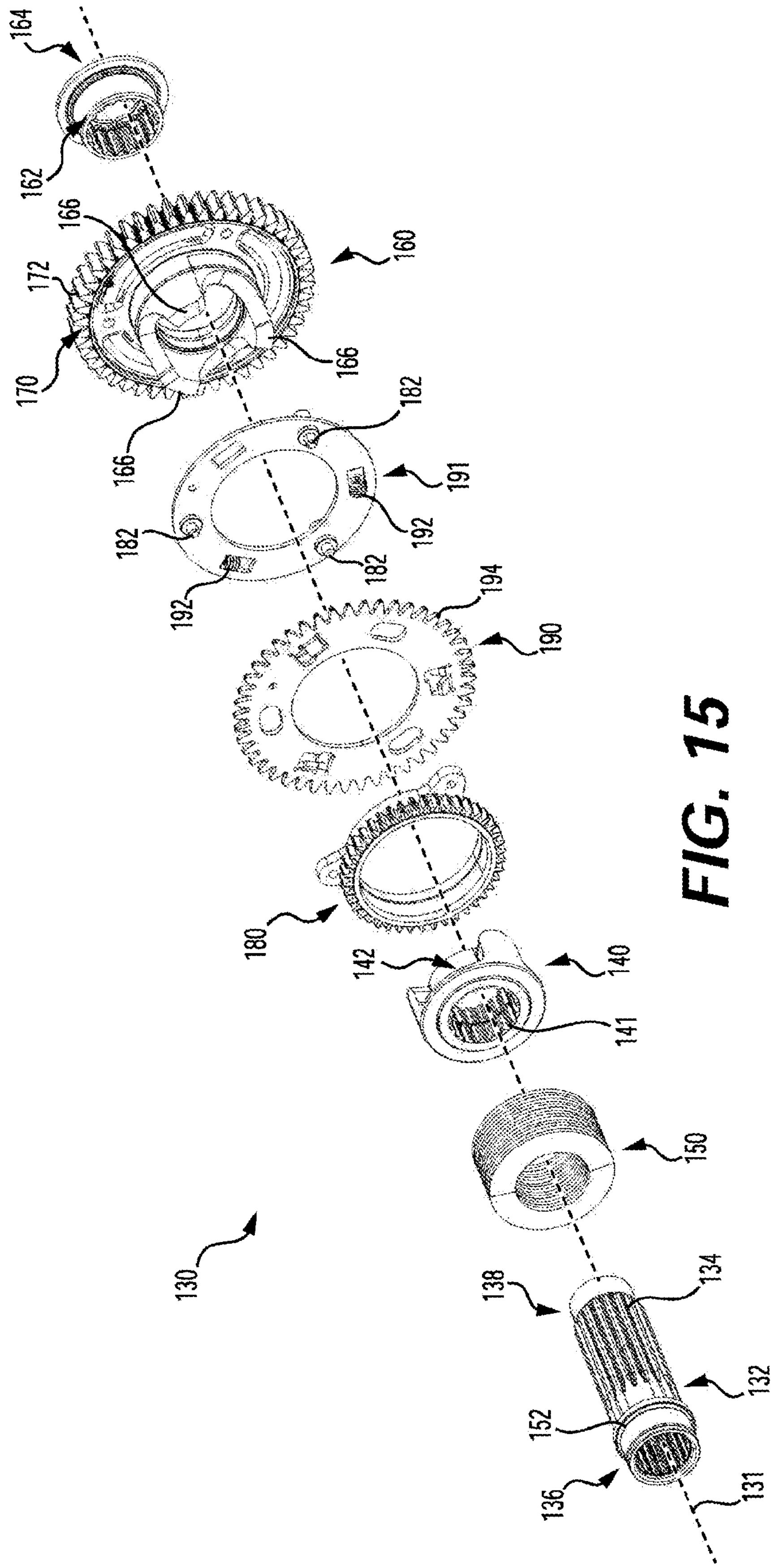
FIG. 15 is an exploded, perspective view taken from a top, front, left side of an input damper of the transmission of FIG. 13.

With additional reference to FIG. 15, the transmission 250 also includes an input damper 130 for operatively connecting the gears 265 to the engine 220 via the crankshaft 222. Specifically, the input damper 130 receives a rear end of the crankshaft 222 therein. The input damper 130 is adapted to reduce the torque variations from the crankshaft 222 to the transmission 250. The input damper 130 has a hollow shaft 132 defining splines 134 for connection to the crankshaft 222 (splines on the crankshaft 222 visible in at least FIG. 10). The hollow shaft 132 has a front end 136 and a rear end 138 defined consistently with the forward travel direction of the vehicle 10. The hollow shaft 132 also defines an input damper axis 131 about which the hollow shaft 132 rotates. An input member 140 is slidably engaged to the hollow shaft 132 and positioned between the front and rear ends thereof. The input member 140 has splines 141 complementary to splines 134, and the input member 140 can slide axially along the input damper axis 131 between the front and rear ends 136, 138. The input member 140 defines three recesses 142 angularly displaced by about 120 degrees relative to the input damper axis 131. A disc spring assembly 150 is connected to the hollow shaft 132 and extends between the front and rear ends 136, 138. The disc spring assembly 150 abuts a shoulder 152 of the hollow shaft 132 and biases the input member 140 axially along the input damper axis 131 towards the rear end 138 of the hollow shaft 132. An output member 160 is disposed over the hollow shaft 132 and positioned between the input member 140 and the rear end 138 of the hollow shaft 132. The output member 160 is supported by bearings 162 disposed between the output member 160 and a connector 164 disposed adjacent the rear end 138 of the hollow shaft 132. The connector 164 retains the output member 160 on the hollow shaft 132. The output member 160 defines three cams 166 also angularly displaced by about 120 degrees relative to the input damper axis 131. The three cams 166 are structured and configured for engaging the corresponding three recesses 142 of the input member 140 when the input member 140 is biased towards the rear end 138 of the hollow shaft 132. An output gear 170 is connected to the output member 160, and also rotates about the input damper axis 131. The output gear 170 has a plurality of teeth 172. A pump gear 180 is connected to the output gear 170 via three fasteners 182 and extends between the output gear 170 and the disc spring assembly 150. The pump gear 180 also rotates about the input damper axis 131. The pump gear 180 is adapted to drive a transmission fluid pump (not shown). An auxiliary output gear 190 is connected to the output gear 170 via a ring 191 having coil spring assemblies 192. The auxiliary output gear 190 is biased by the coil spring assemblies 192 and has a plurality of teeth 194. In the present implementation, the number of teeth 172 of the output gear 170 matches the number of teeth 194 of the auxiliary output gear 190. The coil spring assemblies 192 permits angular displacements of the auxiliary output gear 190 about the input damper axis 130 relative to the output gear 170. The auxiliary output gear 190 provides preload on the teeth 172 of the output gear 170 and reduces backlash that can occur between the output gear 170 and a central clutch gear of a dual-clutch 255.

With continued reference to FIGS. 13 to 15, the dual-clutch 255 includes a central clutch gear, two clutches, and a clutch pack drum connected together (not separately identified). The dual-clutch 255 is disposed on a shaft 258 operatively connected to one of the axles 260. The dual-clutch 255 also has teeth adapted to mesh with the teeth 172 of the output gear 170 and the teeth 194 of the auxiliary output gear 190. The central clutch gear of the dual-clutch 255 thus operatively connects the crankshaft 222 via the input damper 130 to the axles 260 and gears 265 for selectively transferring torque therethrough.

Returning to FIGS. 11 to 14, the rear drive unit 200 further includes the rear final drive 290, operatively connected to the transmission 250. As is mentioned above, the rear final drive 290 is housed in the final drive housing 285 which is selectively fastened to a rear of the transmission housing 252. The rear final drive 290 is received in a recess 287 of the housing 285 (see FIG. 11). An exterior face 291 of the rear final drive 290, specifically on a left side thereof, is configured to selectively fasten to the housing 285 in order to selectively maintain the rear final drive 290 in the recess 287.

The rear final drive 290 in the illustrated embodiment is specifically a bevel drive 290. It is contemplated, however, that the rear final drive 290 could be differently implemented in some cases, for instance as a spool gear drive. The rear final drive 290 disposed rearward of the transmission 250 and is specifically connected thereto by a rear output shaft 270 (see FIG. 14). The rear output shaft 270 rotates about a rotation axis 272, illustrated in FIG. 12. The rotation axis 272 is parallel to the crankshaft axis 223, as well as the longitudinal direction 97. The output shaft 270 has a bevel gear 275 defined and formed in a rear portion thereof. The bevel gear 275 is adapted to operatively connect the shaft 270 to the rear final drive 290 for driving the rear wheels 18, via the shafts 39 (as indicated by arrows of FIGS. 13, 14).

Extending from the transmission 250 to the rear final drive 290, the rear output shaft 270 is disposed in an interior of the final drive housing 285. The rear output shaft 270 is disposed in a passage 288, formed in the housing 285, extending from a forward side of the housing 285 to the recess 287. The rear output shaft 270 thus connects to the rear final drive 290 in the recess 287 of the housing 285.

The rear output shaft 270 is operatively connected to the transmission 250 by two gears 271 disposed on a forward portion thereof, specifically a low transmission gear 271 and a high transmission gear 271 disposed rearward of the low transmission gear 271. The teeth of the gears 271 are arranged to engage teeth of two of the gears 260 of the transmission 250 for transferring torque from the transmission 250 to the output shaft 270. Depending on the particular embodiment of the transmission 250, it is contemplated that the output shaft 270 could include more or fewer gears 271 for engaging with the transmission 250.

Figure 7:
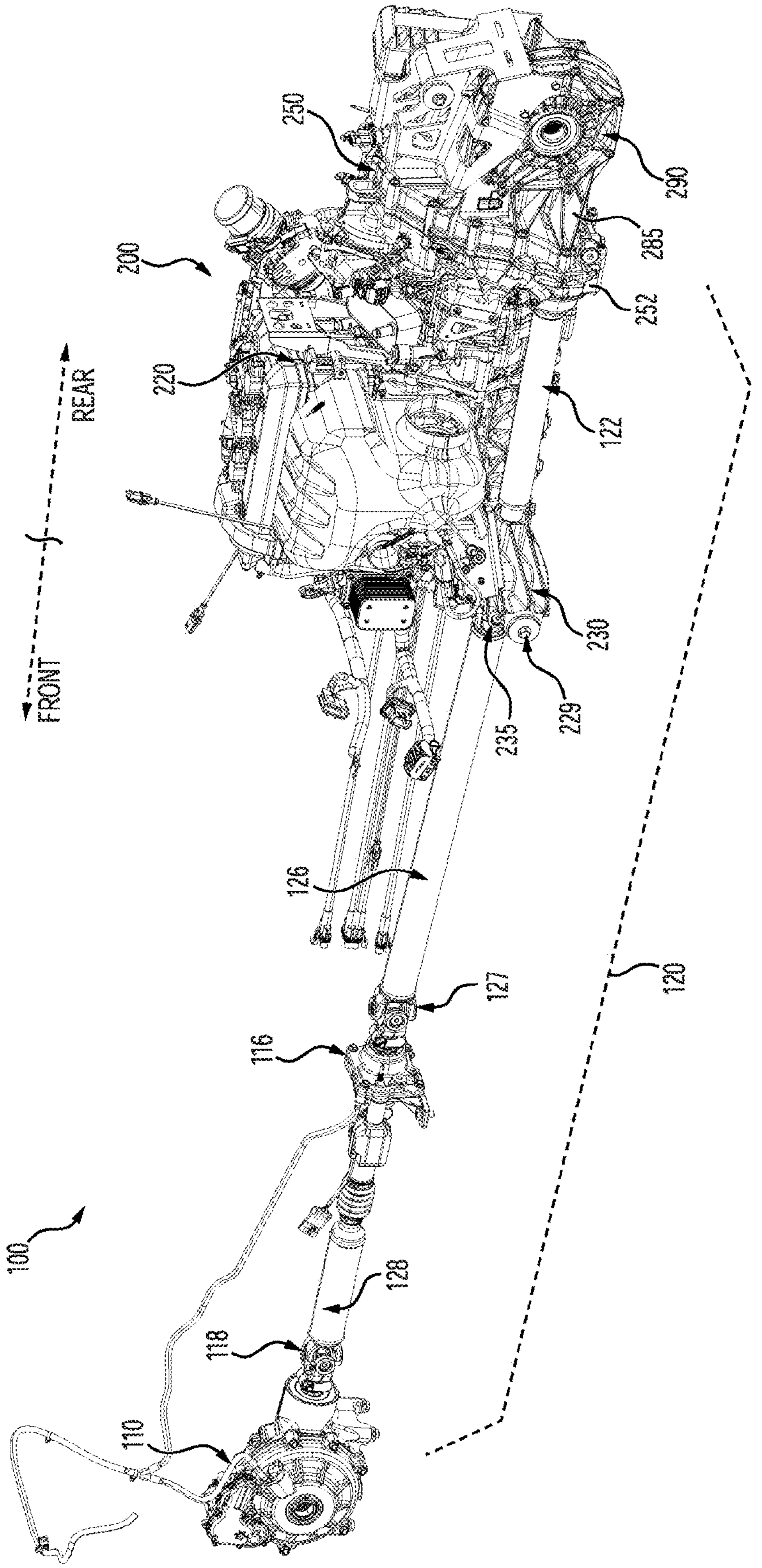
FIG. 7 is a top, rear, left side perspective view of the powertrain of FIG. 4.
Figure 16:
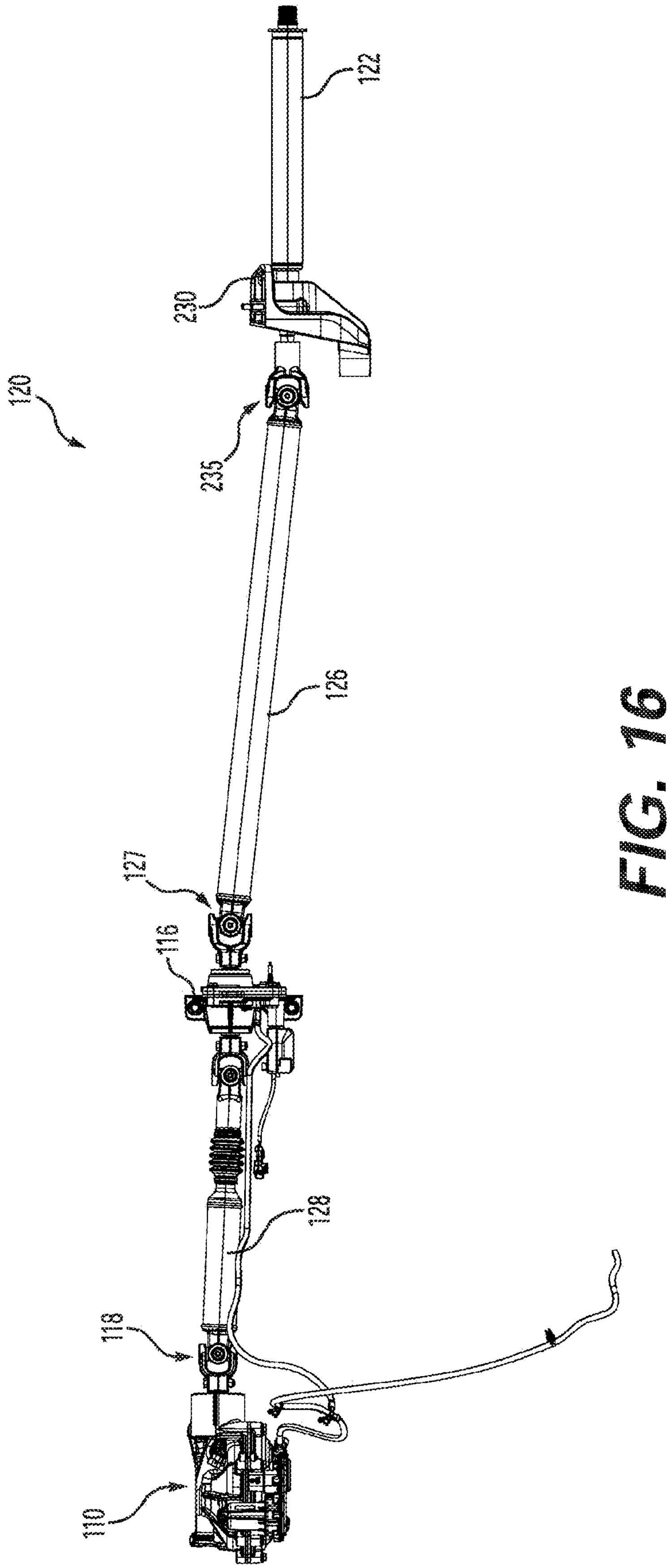
FIG. 16 is a top plan view of a forward drive assembly of the powertrain of FIG. 4.

With additional reference to FIGS. 7 and 16, the powertrain 100 of the vehicle 10 further includes the forward drive assembly 120 operatively connected to and extending forward from the transmission 250. The assembly 120 includes the shaft 122 operatively connected to the transmission 250 at a rear end of the shaft 122. As can be seen in FIG. 14, the shaft 122 is operatively connected to the transmission 250 via the rear output shaft 270. A front transfer gear 273 is disposed on and connected to the output shaft 270. The front drive shaft 122 includes a drive shaft gear 123 connected thereon. The drive shaft gear 123 is adapted and arranged to engage with the front transfer gear 273 on the output shaft 270, such that when shaft 270 is driven by the transmission 250, the shaft 122 is also driven for transferring torque along the forward drive assembly 120.

A front end of the shaft 122 is operatively connected to an intermediate shaft 126. The rear end of the shaft 126 is operatively connected to the front end of the shaft 122 via a universal joint 235 and the engine mount 230 (see FIGS. 10, 17, and 18); specifics of the connection are described further below. It is contemplated that the shafts 122, 126 could be operatively connected by other means.

Figure 10:
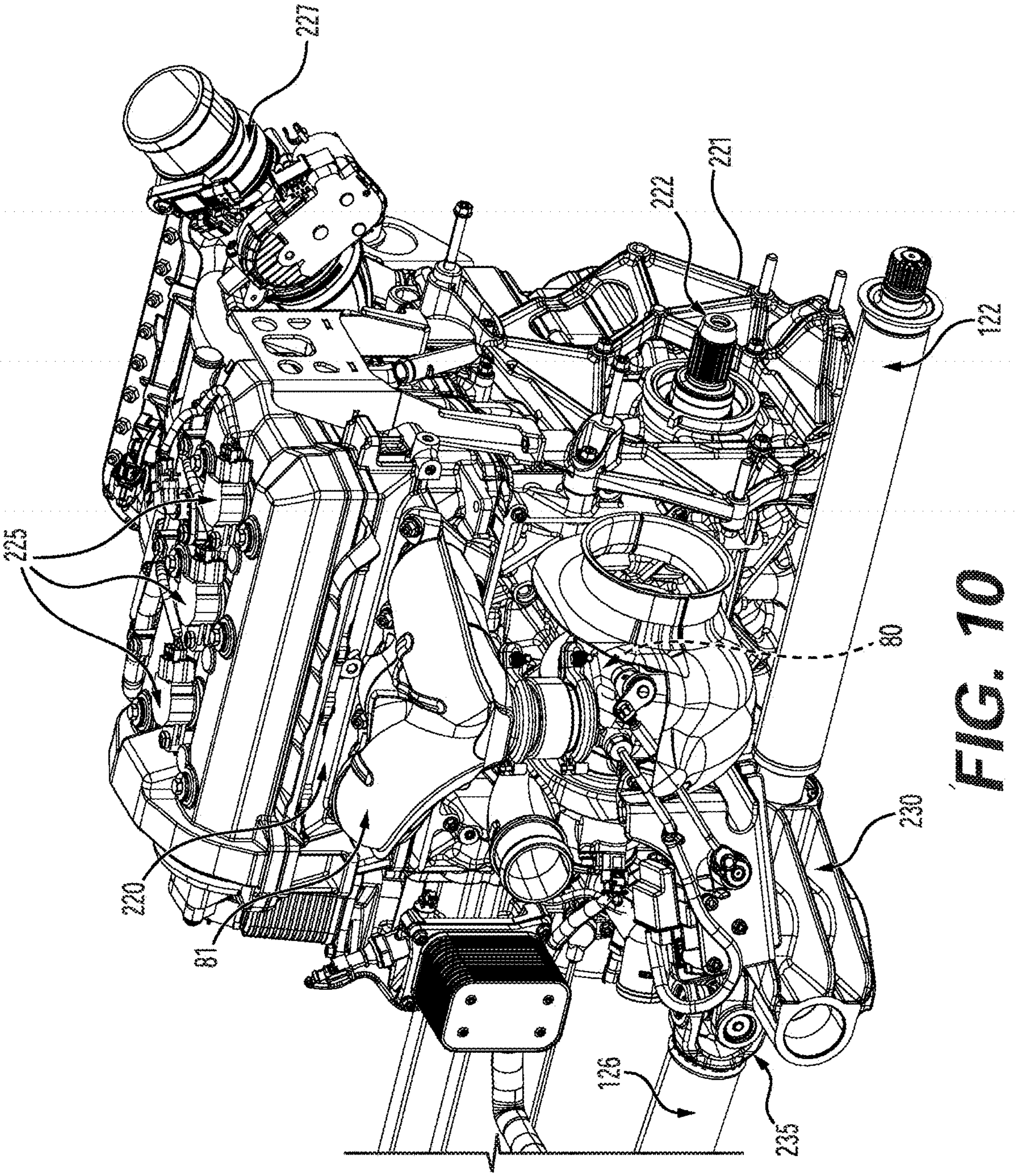
FIG. 10 is a rear, left side perspective view of the rear drive unit of FIG. 8.

As can be seen in FIG. 10, the shafts 122, 126 are disposed generally to the side of the engine 220, rather than, for example, extending under or over the engine 220. As can be seen in FIG. 6, a lowest point of the engine 220 is vertically lower than a top surface height of the drive shaft 126, as well as the drive shaft 122 generally aligned with the drive shaft 126. This can be seen at least from the crankshaft 222 further vertically overlapping with the shafts 122, 126. The drive shaft 122 is disposed partially rearward of the engine 220, while the drive shaft 126 is disposed partially forward of the engine 220. As can be seen from the cross-sectional view in FIG. 6, the shaft 126 is disposed on a left side of the vehicle center plane 99, as is the shaft 122 which is generally aligned with the shaft 126 at the position of the cross-section. As can further be seen in FIG. 6, the lower frame tubes 13 are generally vertically lower than the drive shafts 122, 126. The frame tubes 13 being disposed lower than the drive shafts 122, 126 generally aid in preventing ground or obstacle contact with the drive assembly 120 in case of a bottoming-out of the vehicle 10.

A front end of the intermediate shaft 126 is operatively connected to a rear end of a forward drive shaft 128. In the illustrated embodiment, the forward drive assembly 120 includes a disconnect unit 116 which operatively connects the shaft 126 to the shaft 128 for selectively transferring torque therebetween. Specifically, a forward end of the shaft 126 connects to the disconnect unit 116 via a universal joint 127. As the drive shaft 122 is disposed to the left of the center plane 99 and the front final drive 110 is disposed in a central position, the shaft 126 extends rightward, toward the center plane 99 as it extends forward from the joint 235 toward the joint 127.

The disconnect unit 116 permits selective transfer of torque therethrough, to allow the vehicle 10 to be operated selectively in rear-wheel drive or all-wheel drive modes. The disconnect unit 116 is communicatively connected to a control mechanism (not shown) disposed in the cockpit area 22. The control mechanism could be one of a variety of inputs, including but not limited to a button or lever. It is contemplated that the disconnect unit 116 could be omitted in at least some embodiments, such that the vehicle 10 is a full time all-wheel drive.

The powertrain 100 further includes the front final drive 110 disposed forward of the engine 220 and operatively connected to the forward drive assembly 120. The front final drive 110 is coupled to the forward drive shaft 128 by a universal joint 118. The front final drive 110 is operatively connected to front ground engaging members, specifically the front wheels 14. The drive 110 could be implemented in different types, including but not limited to a spool gear, open differential, and a limited slip differential. The front final drive 110 is connected to the front wheels 14 by half-shafts (not shown), although different arrangements are contemplated.

Figure 17:
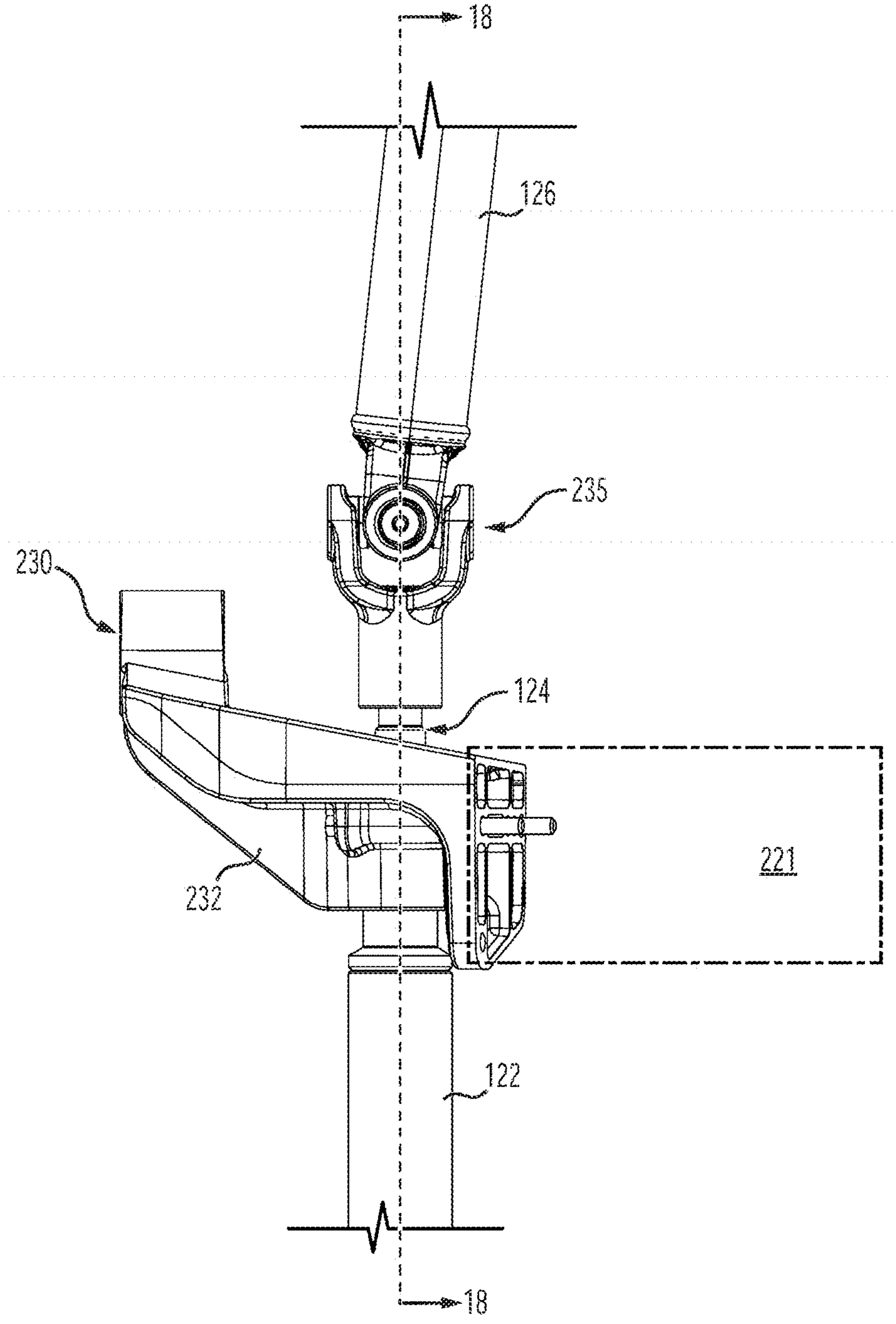
FIG. 17 is a top plan view of an engine mount and portions of drive shafts connected thereto of the vehicle of FIG. 1.
Figure 18:
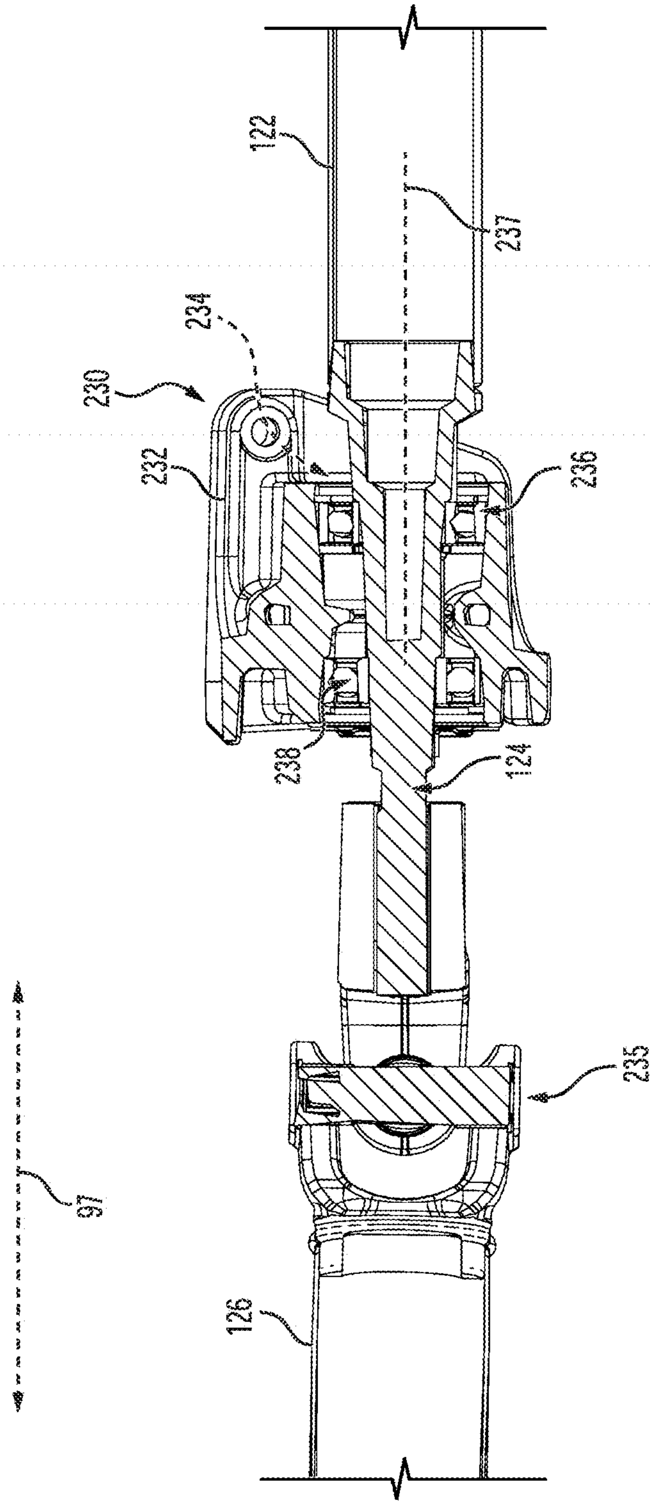
FIG. 18 is a cross-sectional view of the engine mount and the drive shaft portions of FIG. 16, taken along line 18-18 of FIG. 17.
Figure 19:
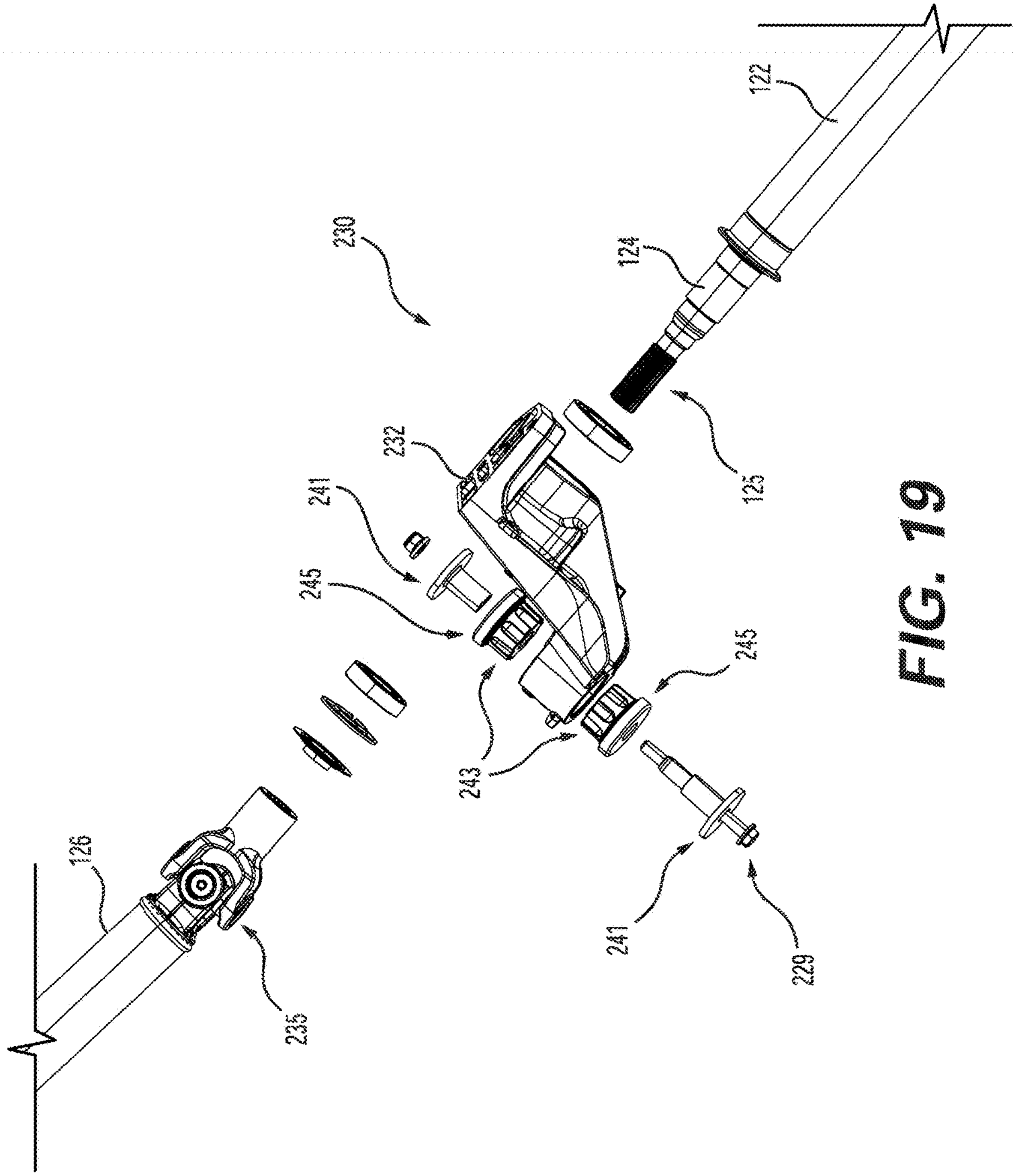
FIG. 19 is an exploded view of the engine mount and the drive shaft portions of FIG. 16.

With reference to FIGS. 17 to 19, the engine mount 230 and the connection between the shafts 122, 126 will be described in greater detail. The engine mount 230 includes an engine mount body 232. The engine mount body 232 is configured to connect to the engine casing 221. As is illustrated schematically in FIG. 17, the engine mount body 232 is formed to be selectively fastened to the engine casing 221, specifically on a left side of the engine 220. The engine mount body 232 is further configured for connecting to the frame 12. As can be seen in FIG. 7 and further in FIG. 19, the engine mount body 232 includes a rubber mount and a bolt 229 for vibrationally isolating and connecting to the frame 12. The rubber mount is specifically received in bracket-like portions 213 of the frame 12, shown in FIG. 6. The rubber mount is formed from two rubber members 243, each one being bonded to a metallic bushing 245, with two additional metallic bushing 241 enclosing the rubber members 243 and receiving the bolt 229 therethrough.

The engine mount body 232 defines a passage 234 therethrough, shown in cross-section in FIG. 18. As installed in the vehicle 10, the passage 234 is oriented longitudinally with respect to the vehicle 10, i.e. aligned with the longitudinal direction 97. The engine mount 230 also includes two bearings 236, 238 disposed in the engine mount body 232. Specifically, the bearings 236, 238 are disposed in the passage 234. It is contemplated that the engine mount 230 could include more bearings disposed therein. It is also contemplated that the engine mount 230 could include only one of the bearings 236, 238. The bearings 236, 238 each rotate about an axis of rotation 237, also aligned with the longitudinal direction 97. The bearings 236, 238 are arranged to receive the coupling between the drive shaft 122 and the drive shaft 126.

Through the engine mount 230, the drive shafts 122, 126 are arranged to transfer torque therebetween. In the illustrated embodiment, the drive shafts 122, 126 are coupled by a universal joint 235 connected to the shaft 122 and a shaft 124 connected to the drive shaft 122 at one end and to the universal joint 235 at the other. The shaft 124 includes splines 125 at an end thereof which are received in the universal joint 235 for operatively connecting the joint 235 and the shaft 124, as can be seen in FIG. 19. The shaft 124 is welded to the shaft 122, at an end opposite the splines 125. The shafts 122, 124 could be differently connected in some embodiments. The bearings 236, 238 receive the shaft 124 on a rear side of the engine mount 230, and are coupled to the drive shaft 126 via the shaft 124 and the universal joint 235.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
two front wheels operatively connected to the frame;
two rear wheels operatively connected to the frame;
an engine including:
an engine casing, and
a crankshaft extending longitudinally rearward from the engine casing; and
an engine mount connecting the engine to the frame, the engine mount comprising:
an engine mount body connected to the engine casing, and
at least one bearing disposed in the engine mount body;
a multi-gear transmission operatively connected to the engine via the crankshaft, the multi-gear transmission including:
a front transfer gear, and
a rear final drive;
two rear shafts connecting the rear final drive to the rear wheels; and
a drive shaft operatively connected between the multi-gear transmission and the at least one bearing, the drive shaft including a drive shaft gear disposed thereon, the drive shaft gear being engaged with and driven by the front transfer gear,
the drive shaft extending forward from the multi-gear transmission, the drive shaft being arranged parallel to the crankshaft,
the two rear shafts extending perpendicular to the drive shaft.

2. The vehicle of claim 1, wherein:
the drive shaft is a first drive shaft;
the first drive shaft is connected to the at least one bearing on a rear side of the engine mount;
the vehicle further comprises a second drive shaft operatively connected to the at least one bearing on a front side of the engine mount; and
the first and second drive shafts being arranged to transfer torque therebetween.

3. The vehicle of claim 1, wherein a bottom surface of the engine is lower than a top-most point of the drive shaft.

4. The vehicle of claim 1, wherein:
the drive shaft extends longitudinally between the at least one bearing and the transmission.

* * * * *